United States Patent Office 2,750,694
Patented June 19, 1956

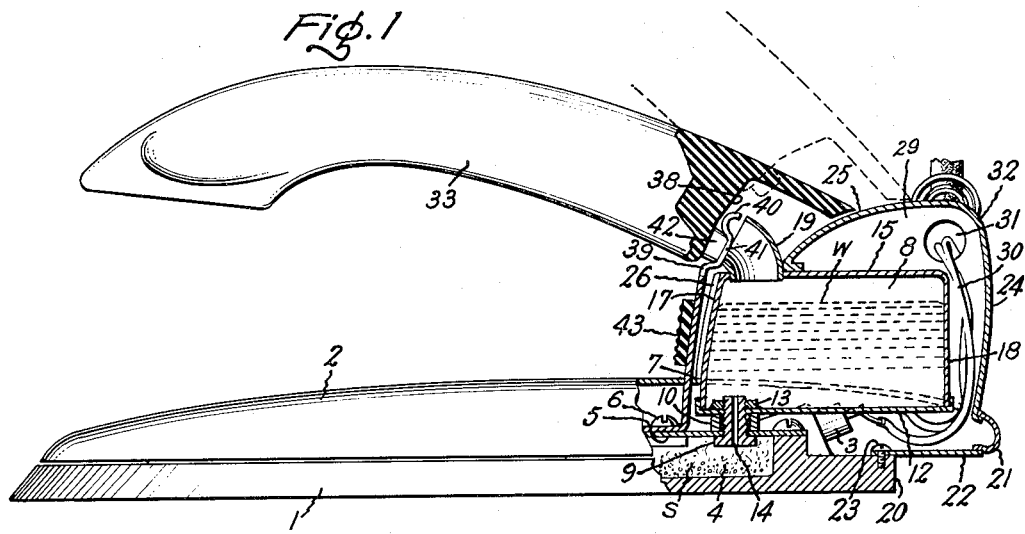
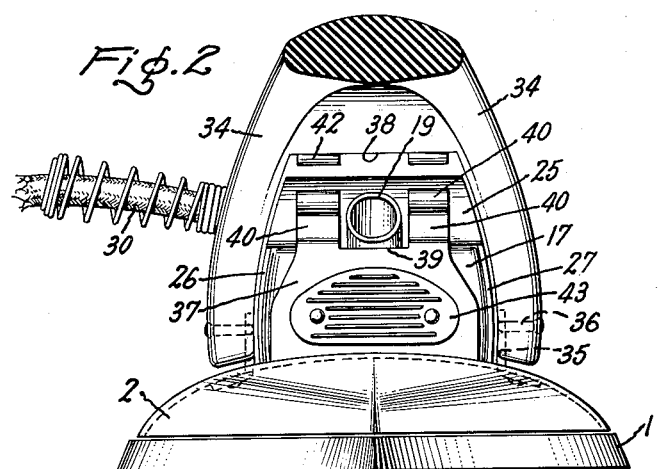
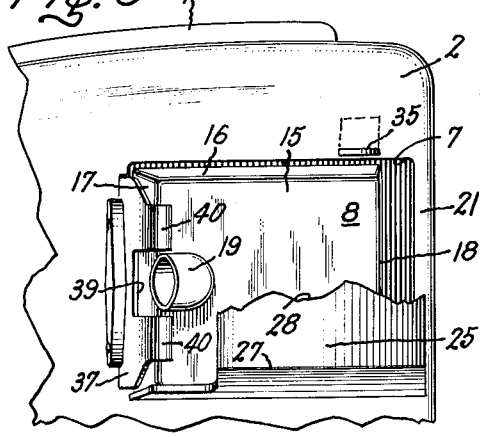

2,750,694

STEAM FLATIRON

Richard O. Spencer, Pacific Palisades, Calif., assignor to General Electric Company, a corporation of New York Application January 21, 1954, Serial No. 405,328

5 Claims. (Cl. 38—77)

The present invention relates to steam flatirons wherein a reservoir for holding water is built directly into and forms a part of the flatiron. It relates more particularly to flatirons of the so-termed "travel" type which are provided with pivoted handles whereby the handle may be folded down onto the top wall of the flatiron cover to minimize the size of the flatiron when it is to be packed, although, especially as to certain aspects, it is not limited thereto necessarily.

An object of the invention is to provide an improved steam flatiron which is simple in structure, compact, convenient to use, and capable of being manufactured at low cost; and for a consideration of what I believe to be novel and my invention attention is directed to the following specification and to the claims appended thereto.

According to a now preferred form of the invention water is supplied to the steam chamber of a flatiron from a water reservoir mounted on the rear top portion of the flatiron body midway between the side edges of the body, the reservoir being enclosed in a housing the rear corner of which in connection with the rear end of the flatiron body cover forms a heel rest for the flatiron. A handle is pivoted on the flatiron body by a bifurcated end post which forms a part of the handle, the two legs of the bifurcation straddling and extending down on opposite sides of the reservoir and being pivoted at their lower ends on the flatiron body. The water reservoir has a filling spout at its top forward end which faces forwardly and upwardly and is covered by a wall of the handle when the handle is in its normal ironing position. Spring latch means is provided for holding the handle in ironing position which when released permits of the handle being pivoted upward to uncover the filling spout so the reservoir can be filled with water or pivoted downward to rest on the top of the flatiron body when the flatiron is to be packed.

In the drawing, Fig. 1 is a side elevation, partly in section, of a steam flatiron embodying my invention.

Fig. 2 is a view looking toward the right-hand end of Fig. 1, the handle being shown in section and turned on its pivots to its reservoir filling position.

Fig. 3 is detail top plan view, partly broken away and with the pivoted handle removed, illustrating the water reservoir arrangement.

Referring to the drawing, 1 indicates the soleplate and 2 the cover of the flatiron, the two parts being fastened together by suitable means (not shown) and together forming the body of the flatiron. In soleplate 1 is a suitable heating unit, the terminals of which are indicated at 3. The soleplate is provided with walls which define a steam chamber 4 closed by a cover plate 5 fixed in place by screws 6. Steam chamber 4 is utilized for generating steam which is supplied through suitable passages to orifices in soleplate 1 through which the steam is directed to the surface being ironed. Such passages and orifices are not illustrated as their specific structure and arrangement form no part of the present invention. Any suitable arrangement may be used. The flatiron may or may not be provided with thermostat means for regulating the temperature of the soleplate, as found desirable; and if such thermostat means is provided it may be or it may not be manually adjustable as found desirable.

The structure so far described is to be taken as typical of any suitable steam flatiron body having a steam chamber therein in which steam is generated for steam ironing. My invention has to do with the structure and arrangement for supplying water to the steam chamber.

At the rear end of the flatiron, cover 2 is provided with a rectangular opening 7 which in part at least is directly over steam chamber 4. In opening 7 and supported on coverplate 5 is a water reservoir 8. The reservoir is connected to and supported on coverplate 5 by means of a threaded sleeve 9 which projects through an opening in the cover plate and has a head in engagement with the cover plate. The reservoir is held in spaced relation to the cover plate by a spacer 10 through which sleeve 9 passes. Sleeve 9 extends through an opening in the bottom wall of reservoir 8 and threads into a nut 13 attached to the inner surface of such wall. The bottom wall of the reservoir is thus clamped against the top surface of spacer 10. In sleeve 9 is a metering orifice 14 through which water from reservoir 8 may flow at a desired rate to steam chamber 4. The top wall of reservoir 8 is indicated at 15, the side walls at 16, and the front and rear walls of 17 and 18. At the forward end of top wall 15 is a filling spout 19 the open end of which faces forwardly and upwardly.

Cover 2 projects beyond the rear end 20 of soleplate 1 as indicated at 21 and the space between end 20 and the rear end of cover 2 is closed by a plate 22 fastened to soleplate 1 by a screw or screws 23.

Reservoir 8 is enclosed by a housing or cover, the rear end wall of which is indicated at 24, the top wall at 25, and side walls at 26 and 27. In Fig. 3 side wall 26 is omitted and top wall 25 is broken away along line 28 to show the arrangement beneath it of opening 7 and reservoir 8. Rear wall 24 and top wall 25 of the reservoir cover stand in spaced relation to the reservoir to provide a chamber 29 in which wiring for the flatiron as indicated at 30 may be housed, the wiring extending out through an opening 31 in reservoir cover side wall 26. The rear end 21 of cover 2 and the top rear corner 32 of the reservoir cover form a heel rest on which the flatiron may be upended.

Pivotally mounted on cover 2 is a flatiron handle which in its normal ironing position has a wall which covers the open end of filling spout 19. The arrangement is such that the handle may be raised above its normal ironing position to give access to spout 19 for filling the water reservoir and lowered down against the top wall of cover 2 when the flatiron is to be packed. The flatiron handle comprises a grip portion 33 which when the flatiron is to be used for ironing extends in generally parallel spaced relation to the top wall of cover 2 as shown in full line in Fig. 1, and a bifurcated rear end supporting post, the two legs 34 of which straddle and extend down on opposite sides of the reservoir cover and are pivotally mounted on cover 2 by suitable means such as ears 35 which are fixed to and project up from cover 2 to which the legs 34 are pivotally connected by pins 36.

Means is provided for latching or holding the handle in ironing position which means is readily releasable to permit of the handle being raised to uncover filling spout 19 or lowered down against the top wall of cover 2. In the present instant this holding means is shown as comprising a spring latch plate 37 fixed at its lower end on steam chamber cover plate 5 by one or more of the screws 6. Its upper end terminates adjacent to a wall 38 at the rear end of handle grip portion 33 (the wall which covers the open end of spout 19), and is provided with a notch 39 in line with the end of filling spout 19 thus providing two fingers 40 which extend up on opposite sides of filling spout 19. Fingers 40 are shaped to provide pockets 41 in which bosses 42 projecting from wall 38 are adapted to engage. Spring plate 37 is biased towards bosses 42 by its inherent resiliency. At times spring plate 37 may be hot when it is being moved to release the handle and to protect the finger of the operator it is provided with a finger pad 43 of suitable heat resistant material.

When no water is in reservoir 8, the flatiron may be used for dry ironing in the well understood manner, the handle being in its ironing position as shown in full lines in Fig. 1.

When the flatiron is to be used for steam ironing, spring latch plate 37 is pressed rearwardly to release bosses 42 after which the handle is turned on its pivots to the dotted line position indicated in Fig. 1 thus uncovering the end of filling spout 19. The flatiron can be then held in a convenient position or positioned in its upended position on its heel rest and water passed through spout 19 to fill the reservoir. In Fig. 1, W indicates water in the reservoir. After the desired amount of water has been put into the reservoir the handle may be turned back to ironing position. When the flatiron is on its heel rest, it is positioned beyond the vertical so that water will not flow out of spout 19 or through metering orifice 14. The flatiron is now ready for steam ironing. When being used for steam ironing water is fed through metering orifice 14 to the steam chamber where it is flashed into steam, as indicated at S, the steam being then fed to the surface being ironed as is well understood.

After ironing is finished the handle may be released and first moved to reservoir filling position and any water remaining in the reservoir emptied out and then moved back either to its normal ironing position or to its folded down position. When moved to its folded down position, bosses 42 slide down along the front surface of latch plate 37 which while the handle is in folded down position serves to frictionally hold it in such position.

The mounting of the water reservoir on the rear top portion of the flatiron body midway between its side edges and between furcations of the supporting portion of the pivoted handle has the advantage that it results in a compact structure which adds to neither the overall length nor the height of the flatiron, a thing of importance in a travel flatiron. At the same time it provides a simple construction which is satisfactory in operation, capable of being manufactured at low cost and which can be styled to give a pleasing appearance. Also, the mounting of the water reservoir in an opening in the flatiron cover so that the bottom wall of the reservoir is adjacent to and is supported on the cover plate of the steam chamber is of advantage in that it makes possible the use of very simple means for feeding water from the reservoir to the steam chamber and at the same time enables the use of a water reservoir of maximum height.

What I claim as new and desire to secure by Letters Patent of the United States is:

1. In a steam flatiron, a flatiron body comprising a soleplate and a top cover, walls which define a steam chamber in the body at its rear end, a cover plate for the steam chamber, said top cover having an opening a part of which is over said steam chamber cover plate, a water reservoir mounted through said opening on said top cover, means defining a metering orifice for regulating flow of water from the reservoir to the steam chamber, and a handle for the flatiron having at its rear end furcations which straddle the reservoir and are attached to the flatiron body on opposite sides of the reservoir whereby the reservoir is housed between said furcations.

2. The combination defined by claim 1 wherein the furcations are pivotally connected to the flatiron body whereby the handle may be folded down thereon.

3. In a steam flatiron, a flatiron body, walls defining a steam chamber therein, a water reservoir mounted on the rear portion of the flatiron body midway between its side edges, means defining a metering orifice for regulating flow of water from the reservoir to the steam chamber, a handle bifurcated at its rear end to provide legs which extend down on opposite sides of the reservoir whereby the reservoir is located between them, means pivotally mounting the lower ends of said legs on the flatiron body, latch means for holding the handle in ironing position, and a filling spout for said reservoir covered by said handle when in ironing position and which is uncovered when the handle is moved above ironing position.

4. In a steam flatiron, a flatiron body comprising a soleplate and a top cover, walls which define a steam chamber in the body at its rear end, a cover plate for the steam chamber, said top cover having an opening a part of which is over said steam chamber cover plate, a water reservoir mounted through said opening on said top cover, means defining a metering orifice for regulating flow of water from the reservoir to the steam chamber, a handle for the flatiron having at its rear end furcations which straddle the reservoir and are pivotally attached to the flatiron body on opposite sides of the reservoir, said reservoir being housed between said furcations, and a filling aperture for said reservoir covered by said handle when in normal ironing position and exposed when said handle is pivoted to a different position.

5. In a stream flatiron, a flatiron body comprising a soleplate and a top cover, walls which define a steam chamber in the body at its rear end, a cover plate for the steam chamber, said top cover having an opening a part of which is over said steam chamber cover plate, a water reservoir mounted through said opening on said top cover, means defining a metering orifice for regulating flow of water from the reservoir to the steam chamber, a handle for the flatiron having at its rear end furcations which straddle the reservoir and are pivotally connected to the flatiron body, and a filling spout for said reservoir which is covered by a wall of the handle when the handle is in ironing position and which is uncovered when the handle is moved away from ironing position.

References Cited in the file of this patent

UNITED STATES PATENTS

| 2,237,381 | Wallace | Apr. 8, 1941 |
| 2,479,429 | Swenson | Aug. 16, 1949 |
| 2,483,816 | Edwards | Oct. 4, 1949 |
| 2,506,950 | Butman | May 9, 1950 |